(12) United States Patent
Le Signor et al.

(10) Patent No.: US 12,730,021 B2
(45) Date of Patent: Sep. 8, 2026

(54) SOFT FORCE SENSOR

(71) Applicant: Melexis Technologies SA, Bevaix (CH)

(72) Inventors: Theo Le Signor, Bevaix (CH); Gael Close, Bevaix (CH); Nicolas Dupre, Bevaix (CH)

(73) Assignee: Melexis Technologies SA, Bevaix (CH)

( * ) Notice: Subject to any disclaimer, the term of this patent is extended or adjusted under 35 U.S.C. 154(b) by 442 days.

(21) Appl. No.: 18/328,093

(22) Filed: Jun. 2, 2023

(65) Prior Publication Data

US 2023/0393002 A1 Dec. 7, 2023

(30) Foreign Application Priority Data

Jun. 3, 2022 (EP) .................................... 22177298

(51) Int. Cl.

| | |
|---|---|
| ***G01L 5/00*** | (2006.01) |
| ***B25J 9/16*** | (2006.01) |
| ***B25J 13/08*** | (2006.01) |
| ***B25J 15/08*** | (2006.01) |
| ***G01L 1/12*** | (2006.01) |
| ***G01L 1/24*** | (2006.01) |

(52) U.S. Cl.

CPC ........... *G01L 5/0061* (2013.01); *B25J 9/1612* (2013.01); *B25J 13/085* (2013.01); *G01L 1/122* (2013.01); *G01L 1/24* (2013.01); *B25J 15/08* (2013.01)

(58) Field of Classification Search

CPC ......... G01L 5/0061; G01L 1/122; G01L 1/24; G01L 5/226; B25J 9/1612; B25J 13/085

See application file for complete search history.

(56) References Cited

U.S. PATENT DOCUMENTS

| | | | |
|---|---|---|---|
| 5,844,146 A | 12/1998 | Murray et al. | |
| 7,380,475 B2 * | 6/2008 | Selig | B60R 21/01516 73/862.626 |
| 8,182,197 B2 * | 5/2012 | Meisho | B25J 17/0208 74/490.06 |
| 11,852,557 B2 * | 12/2023 | Hofmann | G01L 3/1435 |
| 12,510,426 B2 * | 12/2025 | Lu | B25J 13/085 |
| 2004/0079175 A1 * | 4/2004 | Dukart | G01G 19/4142 73/862.391 |
| 2019/0078945 A1 | 3/2019 | Chijioke et al. | |
| 2021/0285830 A1 | 9/2021 | Schmitz et al. | |
| 2021/0302244 A1 | 9/2021 | Mei et al. | |

FOREIGN PATENT DOCUMENTS

| | | | |
|---|---|---|---|
| DE | 102006044779 A1 * | 4/2008 | G01L 1/26 |
| DE | 102019201169 A1 | 7/2020 | |
| EP | 4644855 A1 * | 11/2025 | G01L 5/228 |

OTHER PUBLICATIONS

Extended European Search Report from Corresponding European Patent Application No. EP22177298.1, Mar. 15, 2023.

International Search Report from Corresponding PCT Application No. PCT/EP2023/059549, Jun. 30, 2023.

* cited by examiner

*Primary Examiner* — Octavia Hollington

(74) *Attorney, Agent, or Firm* — Workman Nydegger

(57) ABSTRACT

A soft sensor arrangement for measuring a force includes a sensor, a deformable element deformable by the force, and an element for reacting with the sensor for measuring the force by a deformation of the deformable element. The deformable element extends at least partially between the sensor and the element.

16 Claims, 5 Drawing Sheets

200
pressure
120
α
130
$d_{2'}$
$d_3$
$d_{1'}$
$d_{1''}$
140
140
110

200
pressure
120
130
150
$d_{2'}$
$d_3$
$d_{1'}$
140
140
110

100
120
130
$d_2$
$d_1$
150
$d_3$
140
140
110

SOFT FORCE SENSOR

TECHNICAL FIELD

The invention of the current application relates to a soft force sensor arrangement and a respective method for measuring a force therewith.

BACKGROUND

A force sensor returns an electronic signal proportional to the mechanical force applied to the sensor. It can also be said that a force sensor converts the magnitude of applied force into a related electronic signal. The forces measured can be mechanical quantities such as tension, pressure, weight, torque, strain, and interior stress. Force sensors have become indispensable core components of power equipment, engineering machinery, various working machines, and industrial automation systems.

For example, using existing force sensors, the forces applied to workpieces during an automatized manufacturing process can be measured in real time to control the force exerted upon the workpiece. In this way, the force-load of the workpieces can be controlled, and potentially limited, during the manufacturing process. This is in particular important when the workpiece is sensible. Nowadays, force sensors are also used when goods are automatically sorted, stored, or packaged in an automated manner.

In all sectors these force sensors are used to control the force-load onto objects. Often times, the force sensors are used together with multi-axis robotic devices to move, position, and hold objects in a desired position for a desired amount of time. A multi-axis robotic device may, for example, include a gripper. A gripper is a mechatronic device, which exerts a force and a corresponding counterforce onto an object, such that the object can be held by the gripper. Thereby, the force and the counterforce press the object against respective parts of the gripper such that the object and the respective gripper parts come into contact. This contact gives rise to friction between the respective gripper parts and the object, which is proportional to the exerted force and counterforce. If the resulting frictional force is larger than the force of gravity of the gripped object, the object is held stable by the gripper.

A gripper of the above-mentioned type is for example described in DE 10 2019 201169 A1, wherein the gripper is composed of a gripper base body, a sensor plate attached to the gripper base body, at least two gripper jaws, and a one-dimensional force sensor located between the sensor plate and a gripper plate carrier, which holds the gripper jaws. Thereby, the one-dimensional force sensor can measure a compressive force between the sensor plate and the gripper plate carrier.

However, the sensors and therefore also the grippers described in the prior art suffer from the disadvantage that the force applied to the object is not measured with sufficient accuracy. This may cause a damage to the gripped object, by either excising too much force or too less force such that the grip is lost. Both needs to be prevented, as such precise force measurements are necessary. Since for very accurate measurements also very fragile sensors are used, it is also important that the respective sensor arrangements are protected from any damage.

SUMMARY

The above-mentioned objects are solved by the soft sensor arrangement according to the invention. The soft sensor arrangement according to the invention comprises a sensor, a deformable element, and an element for reacting with the sensor. The element may consist of a single element or a plurality of elements. The deformable element may be deformable and may extend at least partially between the sensor and the element. An element is deformable when it undergoes a change of shape and/or volume, when an external force acts onto the element. Thereby, deformable can also mean that the element returns to its originally shape and/or volume once the external force does not act upon the element anymore.

During operation, an object exerts a force onto the sensor arrangement. Thereby, either the element or the deformable element can come into contact with the object. The contact can be direct or indirect. The element or the deformable element may as such be in direct or indirect contact with the object. In case of a direct contact, at least one surface of the element or the deformable element touches at least one surface of the object. In case of an indirect contact, at least some other part is in between the contact surfaces. For the element, this may be the deformable element itself, such that the element is in indirect contact with the object, but the deformable element is in direct contact. In this case it can also be said that the element is embedded in the deformable element. Thereby, the element may be partially or fully embedded in the deformable element. In the latter case, all surfaces of the element are in contact with the deformable element. It can also be said that the material of the deformable element surrounds the element. The other way around, if the deformable element is in indirect contact with the object, the element may be in direct contact with the object. It is however also encompassed that other pieces are in direct contact with the object, whereas the element as well as the deformable element are only in indirect contact with the object. For example, the element may be embedded in a piece of plastic, which is contacting the deformable element. In another example, the piece of plastic is still contacting the deformable element and the object, but the element is embedded in the deformable element, or the element is contacting the deformable element and the piece of plastic. In all three cases, the object will directly contact the piece of plastic but neither the element nor the deformable element directly.

Since the deformable element extends at least partially between the sensor and the element or even surrounds the element, it holds the element in a particular position with respect to the sensor. This position may be defined as a first position of the element with respect to the sensor. It can also be said that the deformable element holds the element in a particular distance from the sensor. If the deformable element is deformed, the element as such performs a coaligned movement in the direction of deformation of the deformable element. If the deformation is a compression, then the distance of the element to the sensor is decreased, whereas if the deformation is a tension, then the distance is increased.

Deformation of the deformable element means that at least one spatial extension of the deformable element is changed in at least one respective spatial dimension. As such, the deformable element of the sensor arrangement may be soft in the sense that is it deformable. The deformability and in particular how much the deformable element can be deformed depends upon the material used for the deformable element. For example, the deformable element can be made of a flexible material. A flexible material is a material which returns to its initial shape once the external force is released. Hence, the deformable element may return to its initial shape if any external force is released. Therefore, the deformable element may also be called a flexible element or an elastic element. In another example, the deformable element may be an elastomer. An elastomer is typically made of monomers linked by weak intermolecular forces. Due to the weak intermolecular forces of the chemical elements of the elastomer, conformational changes of the compounds are possible without or with only partially breaking covalent bonds. This results in that an elastomer may be both viscous and elastic at the same time. Therefore, an elastomer may be deformed by an external force.

The deformation of the deformable element causes the element to move to a second position different to the first position. If the deformable element is compressed, then the second position of the element is closer to the sensor than the first position of the element. If a tension force is applied, then the second position of the element is further away from the sensor than the first position. The change of position can be detected by the sensor of the sensor arrangement by reacting with the element. When reacting with the sensor, the element influences the measurement of the sensor. It could also be said that the element couples with the sensor through a physical effect, which is characteristic of the sensor and the element. This coupling of the element with the sensor depends on the position of the element with respect to the sensor. It could also be said that through the position-dependent coupling, the measurement of the sensor is a unique function of the position of the element with respect to the sensor. In this sense it can be said that the sensor as used in the sensor arrangement is a distance measuring sensor. Such a sensor returns an electronic signal proportional to the position of the element with respect to the sensor.

If no external force is applied to the sensor arrangement, the deformable element is not deformed and the element is located at the first position with respect to the sensor. Hence, a first signal can be measured by the sensor, which corresponds to a zero-force measurement. If a finite external force is applied to the element, the deformable element is deformed, and the element moves to the second position different from the first position. This second position of the element with respect to the sensor leads to a second signal of the sensor, which corresponds to the applied external force. Since the first and second signals can uniquely be mapped to the respective applied external forces, the distance measurements allow to determine the applied external force. In other words, the force applied to the sensor arrangement may be measured by the amount of displacement of the element, when the force deforms the deformable element. Since a change of the interaction of the element with the sensor can be measured with high accuracy, a high accuracy measurement of the applied force can be undertaken. In other words, an alteration of the influence of the element on the sensor allows to infer the external stimulus leading to the alteration, namely the applied external force. For example, as described above, the sensor may be sensitive to the displacement of the element with respect to the sensor.

In this way, the soft sensor arrangement according to the current invention allows for the first time to perform an accurate measurement of the force through a measurement of the amount of deformation of a deformable element. This indirect measurement of the force by let it act upon the deformable element and thereby changing the stimulus the element has on the sensor, it is also possible to measure the force applied with high granularity.

In a preferred embodiment of the invention, another deformable element is in contact with the deformable element and/or with the element. The another deformable element may be at least partially extending between the deformable element and the object. It can also be said that in this case the deformable element is a first deformable element and the another deformable element is a second deformable element. The second deformable element may come into contact with the object when the object is moved towards the second deformable element. When the object exerts a force onto the second deformable element during such a contact, the second deformable element exerts a force onto the first deformable element and/or the element, and the first deformable element is deformed, as described above. Thereby, the second deformable element may also be deformed. However, the second deformable element can be less deformable than the first deformable element or may not be deformed at all. Without any applied force, the thickness of the second deformable element perpendicular to the surface of the sensor may be smaller than the thickness of the first deformable element. The second deformable element may have a different bulk and/or shear modulus as compared to the first deformable element. In particular, the bulk modulus of the second deformable element may be higher than the bulk modulus of the first deformable element. It might also be said that the second deformable element may be more rigid and/or less flexible than the first deformable element. Hence, being more rigid, the second deformable element is less likely to be damaged by the contact with the object than the first deformable element. It could also be said that the second deformable element provides a protective layer to the first deformable element, which prevents damaging of the first deformable element by avoiding direct contact between the first deformable element and the object. Hence, by means of the second deformable element, the deformation properties of the first deformable element are protected. Furthermore, the second deformable element may act as a transducer of the force exerted by the object onto the second deformable element. It could also be said that the second deformable element distributes the force exerted by the object in a homogeneous and uniform manner onto the first deformable element. For example, if the contact of the second deformable element with the object is over a first contact surface and the contact of the element and/or the first deformable element with the second deformable element is over a second contact surface, the second deformable element distributes the force received over the first contact surface onto the second contact surface. Depending on the shape of the object, the first contact surface may be smaller than the second contact surface. In this case, the second deformable element lowers the force or pressure exerted onto the first deformable element and/or the element as compared to if the object would be in direct contact with the first deformable element and/or the element itself. Thereby, the risk to damage the first deformable element is lowered. In other words, the second deformable element avoids point-like stresses of the object onto the first deformable element and/or the element. In addition, or alternatively, the second deformable element may have a specific friction coefficient adapted to the object. In this way, the surface roughness of the second deformable element can be adjusted to the surface roughness of the object which contacts the second deformable element. For example, if the object surface has a low friction coefficient, the friction coefficient of the second deformable element may be raised such that a stable contact of the object and the second deformable element is retained. If the object surface has a high friction coefficient, the friction coefficient of the second deformable element may be lowered, while still retaining the same stable contact. In this way, the grip between the object and the second deformable element may be stabilized, even if the type of object changes. Hence, the second deformable element can be adjusted to the type of the object, without changing the first deformable element. This renders the soft sensor arrangement versatile for a large range of different objects, while still using the same deformable element. It is also encompassed that the second deformable element can be reversible attached to the first deformable element. In other words, the second deformable element may be exchangeable. A different second deformable element may as such be chosen for different applications or for different objects.

In a further preferred embodiment of the invention, the deformable element may be characterized by its shape and/or its bulk modulus and/or its shear modulus. The shape of the deformable element in the non-deformed state may be at least one of a cylinder, a cube, a pyramid, or a dome. The shape and the other chosen properties are thereby adapted to the implementation conditions.

In a further preferred embodiment of the invention, the deformable element may be attached to the sensor. For example, the deformable element may be glued to the sensor. Thereby, for example one adhesive layer, such as a tape, may be used. It is also possible that the deformable element only touches the sensor, without being stably attached to the sensor. As a further example, the deformable element may also not touch the sensor at all. In this case, a free space may exist in between the deformable element and the sensor and holding means to hold the deformable element spaced apart from the sensor. The aforementioned examples shall not be understood as a limitation.

In a further preferred embodiment of the invention, the soft sensor arrangement may further comprise a mechanical stop, wherein the mechanical stop limits the deformation of the deformable element. A mechanical stop acts as such as a physical barrier to limit the amount of deformation possible, i.e., the amount of force which acts upon the deformable element. The mechanical stop thereby exerts a counterforce to the force applied to the deformable element. The force and the counterforce thereby at least partially cancel each other out. It can also be said that the mechanical stop acts as a force absorber which absorbs a least a part of the force applied to the deformable element. The mechanical stop may be a rigid element, which has an extent with respect to the sensor which is shorter than the extent of the non-deformed deformable element with respect to the sensor. This allows the deformable element at least to be partially deformed by an amount which equals to the difference in extent of the mechanical stop and the deformable element in the non-deformed state. Instead of being a rigid element, the mechanical stop may also be an element which consists of a material that is less elastic than the deformable element itself. In this case, the mechanical stop does not function as a hard stop but as a damper, which damps the deformation of the deformable element, since more force must be exerted to compress both the deformable element as well as the mechanical stop. The mechanical stop may not limit the deformation of the deformable element in at least one direction parallel to the surface of the sensor. It could also be said that the mechanical stop may be designed to allow the deformable element to move freely in at least one direction parallel to the surface of the sensor.

The mechanical stop may be fabricated from a single piece of material or a plurality of pieces of material. The mechanical stop can be constructed in a way to surround the deformable element at least partially. Thereby, the mechanical stop may also be configured to hold the deformable element in a fixed position with regards to the sensor.

The mechanical stop may have a gap through which the deformable element can at least partially extend. The gap may also be termed an aperture or a recess within the mechanical stop, through which the deformable element can at least partially extend.

The volume of the recess may be larger than the volume of the non-deformed deformable element extending through the recess. If the shear modulus of the deformable element is not zero, an external force applied to the deformable element in a first direction results in a deformation of the deformable element in at least one direction orthogonal to the first direction. It can also be said that, in this case, the deformable element undergoes not only a linear compression but also a quenching. If the volume of the recess is larger than the volume of the non-deformed deformable element extending through the recess, the recess can easily accommodate the quenched deformable element. In particular, it is possible that the recess is adapted to constrain the deformable element only in one direction orthogonal to the applied external force, but not in the remaining direction orthogonal to the applied external force such that the deformable element is free to be deformed in the remaining direction orthogonal to the applied external force.

At least one edge of the mechanical stop of the soft sensor arrangement facing the deformable element may be oblique and/or rounded. An edge is a sharp part of a geometrical object. It could also be said that an edge includes one or more sharp corners. The sharp corners risk to cut into the deformable element. Hence, removal of the edges of the mechanical stop facing the object avoids deformable element damage. Furthermore, removing the edges from the mechanical stop creates specific volumes inside the mechanical stop, which could be occupied by the deformable element, if the deformable element is quenched.

A distance between the mechanical stop and the sensor may define a space into which the deformable element can be deformed when the external force is applied. The strongest quenching of the deformable element risks to occur where the deformable element touches the sensor, since in this place any further expansion of the deformable element is restricted by the sensor. It could also be said that the sensor defines a mechanical barrier which cannot be transcended by the deformable element. Hence, a space may be defined which extends from the sensor to the mechanical stop. It could also be said that a distance from the sensor can define a pocket inside the mechanical stop. It might also be said that the space may be located in between the sensor and the mechanical stop. The space may be empty if the deformable element is not deformed. However, at least a part of the space may also already be occupied by the deformable element if the deformable element is not deformed. The space serves to accommodate at least a part of the deformable element when the deformable element is deformed. By supplying such an expansion volume to the deformable element, the space contributes to limit the strain exerted onto the deformable element.

The mechanical stop ensures that the sensor is not damaged due to too much force acting upon the sensor by the compressed deformable element. A force overload onto the sensor could lead to cracking and/or breaking of the sensor. Furthermore, the mechanical stop prevents the element to come too close to the sensor, which may cause physical damage to the sensor as well as an impairment of the sensitivity of the sensor since the element reacts with the sensor.

In another preferred embodiment of the invention, the sensor of the soft sensor arrangement may be a passive magnetic sensor and the element may be a magnetic field emanating element, for example a permanent magnet. A magnetic sensor is a sensor which measures at least one property of a magnetic field emanated by the element. By passive magnetic sensor, it is meant that the sensor detects at least one property of the magnetic field caused by the element but does not create the to be measured magnetic field on its own. In general, a magnetic field is a vector field. This means that at each point of space, the magnetic field is characterized by a three-dimensional vector of magnetic field strengths. The passive magnetic sensor may measure one or more magnetic fluxes obtained by projecting the magnetic vector field onto one or more surfaces associated with the passive magnetic sensor. Hence, it could be said that the measured at least one property is the magnetic flux through a respective surface. The measured magnetic flux is proportional to the density of magnetic field lines passing through the respective surface and cutting the respective surface in an orthogonal angle. Each of the magnetic fluxes through the respective surfaces causes the passive magnetic sensor to output a corresponding signal, e.g., a current or a corresponding voltage signal. In particular, the outputted signal may be proportional to the distance of the element to the sensor. If the element changes its position, the magnetic field lines change their position. In this way, a positional change of the element leads directly to a change of the magnetic fluxes measured at the passive magnetic sensor. The outputted signal then gives either a direct indication of how the element has changed its position or can be processed further or combined for determining the position of the element relative to the sensor. Thereby, an algorithm for determining the position of the element from the measured flux signals may rely on difference values between the signals and/or compute a gradient based on the signals measured for a displaced element in case of a deformed deformable element, and for an element at its initial position in case of a non-deformed deformable element. Another algorithm may then be used to infer the external applied force from the position determined by the algorithm. However, the external applied force may also be inferred directly from the measured flux signals without computing the position of the element as an intermediate value. In a general way, it could be said that a change of the interaction of the element with the passive magnetic sensor leads to a change of the at least one property of the magnetic field measured by the passive magnetic sensor. An algorithm may then be used to infer the external force responsible for the change of the interaction from the measured at least one property of the magnetic field.

In addition, or as an alternative, a flux gradient may be measured directly using a transducer which is sensitive to a magnetic field gradient. The use of difference values or of a gradient achieves a stray field-immune position determination since the influence of static stray magnetic fields is cancelled when subtracting the measured signals. In addition, or alternatively to the magnetic flux, the passive magnetic sensor may also measure the orientation of the vector of magnetic field strengths. Measuring the orientation of the vector of magnetic field strengths results in one or more angles describing the orientation of the magnetic field in space. Based on this orientation, the force applied to the deformable element can be derived. By using the change in orientation of the element in relation the sensor, it is also possible to derive in which angles the object deforms the deformable element. In other words, whether a uniform or non-uniform force is applied.

A passive magnetic sensor may comprise at least one sensor element, which measures the at least one physical property of the magnetic field. The at least one sensor element may be a magneto-resistive sensor or a Hall sensor, or all other devices, which are suitable to measure at least one property of the magnetic field emanated by the element.

In another preferred embodiment of the invention, the sensor of the soft sensor arrangement may be an active magnetic sensor and the element may be a target. An active magnetic sensor measures at least one physical property of a magnetic field. Thereby, in contrast to the passive magnetic sensor described above, an active magnetic sensor creates at least one magnetic field on its own. In other words, an active magnetic sensor does emanate a magnetic field on its own. The magnetic interaction of the emanated magnetic field with the target is observed by the active magnetic sensor. The active magnetic sensor may comprise one sensor element that is configured to both generate a magnetic field, and to measure the change of the magnetic field due to the target. For example, the one sensor element may be adapted to act as a generator of the magnetic field for a first time interval, and as a detector of the change of the magnetic field due to the target for a second time interval. Alternatively, the active magnetic sensor may also comprise at least two sensor elements. Thereby, at least one of the at least two sensor elements may be configured to generate a magnetic field, and at least one other of the at least two sensor elements may be configured to measure the change of the magnetic field due to the target. The sensor element configured for measuring the at least one physical property may be similar to the sensor element of the passive magnetic sensor described above.

The generated magnetic field is affected by the target, and at least one physical property of the affected magnetic field is measured by the sensor element configured for measuring the at least one physical property. The form of the target may be not rotationally invariant. In particular, the target can be planar or almost planar. Thereby, the target can have a form, which affects the magnetic field in a preferred direction, which may be substantially the same for the whole target. For example, the target could be structured such that inductive currents preferably flow in a particular linear direction, such that the effect of the target on the generated magnetic field is also directional. For this, the target may comprise at least one slit extending from one end of the target to another end of the target. However, different target designs are equally well possible.

It could also be said that the target affects the magnetic flux coupling between the generator of the magnetic field and the detector measuring the at least one physical property of the magnetic field. The target may comprise a soft magnetic material or a non-magnetic electrically conductive material. Thereby, soft magnetic material means that the magnetic material of which the target is made can be easily magnetized and demagnetized. It could also be said that a soft magnetic material is characterized by that its magnetization decays rapidly in time if an external magnetic field is removed. A soft magnetic material may have a higher relative magnetic permeability and/or a lower coercivity. Coercivity, also called the magnetic coercivity, coercive field or coercive force, is a measure of the ability of a ferromagnetic material to withstand an external magnetic field without becoming demagnetized. Ferromagnetic materials with high coercivity are called magnetically hard, and are for example used to make permanent magnets. Materials with low coercivity are said to be magnetically soft. It could also be said that a soft magnetic material may have a low remanent magnetization. Typically, but not restricted to, a magnetic material is called soft magnetic material if its coercivity is smaller than 1000 A/m. The latter shall however only serve as an example and shall not be understood to be limiting.

If the target is made of a soft magnetic material, the target may affect the magnetic flux coupling by concentrating the magnetic field lines of the generated magnetic field. The soft magnetic material may consist of an isotropic material, which does not feature any preferred direction. If the target is made of a non-magnetic electrically conductive material, energy may be dissipated by induced currents in the electrically conductive material of the target. The induced currents may be eddy currents. In this case, the target affects the magnetic flux coupling by introducing losses of the generated magnetic field due to dissipation. Optionally, the form of the target could be such that the magnetic field lines of the generated magnetic field are aligned into a preferred direction. Additionally, or alternatively, one could also say that the target could act as a magnetic field line rectifier, which aligns the magnetic field lines into a preferred direction. If the target is positioned and/or oriented such that a preferred direction of the magnetic field lines is in the direction of the sensor element, which measures the at least one physical property, the measured at least one physical property will have a maximum value.

In another preferred embodiment of the invention, the sensor of the soft sensor arrangement may comprise an optical receiver detecting light, wherein the detected light may be light emitted, reflected or scattered back from the element. An optical receiver outputs an electronic signal in response to a received quantity of light. The measured physical property can, for example, be the light intensity. The element is characterized by that at least a part of any light falling onto the element is not absorbed by the element. Hence, it could be said that when light is conducted onto the element, the element responds with the non-absorbed part of the light. This response can be a reflection, a scattering, or an emission of light. For example, if the element responds by a reflection, the element returns the non-absorbed part of the light under a reflection angle which has the same magnitude as the angle under which the light falls onto the element (Snell's law of reflection). If the element responds by scattering or by emission, the element may return the non-absorbed part of the light also under an angle which might deviate from the reflection angle predicted by the law of reflection. If the element responds by emission, the wavelength of the returned light may be different than the wavelength of the light falling onto the element. As such, no matter if the element responds with reflection, scattering or emission, the element may return a part of the light falling onto the element into the same half solid angle as the half solid angle, from which the light falls onto the element. Besides the aforementioned, the element itself can also be adapted to produce light itself and emit it towards the sensor.

If the element is moved to a larger distance from the optical receiver, the optical receiver measures a lower light intensity since the returned light is spread over a larger solid angle. In contrast, when the element is approaching the optical receiver, the measured light intensity increases since the optical receiver covers a larger part of the solid angle into which the light is returned by the element. Also, when the element changes its distance with respect to the optical receiver, the angle under which the element appears at the optical receiver is also changed. Similarly, if the element changes its orientation, the intensity of the detected light changes due to a change of the angle under which the element appears at the optical receiver. This changing angle under which the element is perceived by the optical receiver has the effect of that different fractions of the returned light impinge on a detecting area of the optical receiver. Hence, the measured light intensity is a physical property that allows to unambiguously infer the position and/or orientation of the target.

A person skilled in the art is aware of the fact that other physical properties of the light can also be used to infer the position and/or orientation of the element, e.g., the polarization state of the returned light.

The optical receiver may be an avalanche photodiode, a point-like photodetector, a photogrammetry device, or an extended non-point-like detector element similar to that of a CMOS camera. However, all other sorts of devices that output an electronic signal in response to a received quantity of light could be used an optical receiver.

Optionally, the light, which is returned by the element, could initially be emitted by an optical transmitter included in the sensor or by an external light source not included in the sensor. The optical transmitter or the external light source can be a laser diode, a light emitting diode (LED), or any other sort of light emitting device. However, the light, which is returned by the element, may also result from ambient illumination.

In a further preferred embodiment of the invention, the sensor may include a semiconductor package embedding an integrated circuit (IC). In other words, the sensor may be constructed as an integrated circuit (IC), which is part of a semiconductor structure. Usually, it is understood that an integrated circuit (IC) is a very small electronic circuit that is composed of multiple functional units which are attached and/or integrated to a semiconducting substrate. For example, the functional units may comprise transistors, diodes, Hall sensors, coils, laser diodes, photodetectors, electrical connections or waveguides, and the like. The integrated circuit (IC) is embedded into a semiconductor package in the sense that the semiconductor package at least partially surrounds the integrated circuit (IC). Often, it is advantageous to place a controller, which processes the signals outputted by the sensor or which transmits commands to the sensor, not too far from the sensor itself, since this avoids signal losses due to the electrical resistance of wires between the sensor and the controller. Hence, such a controller or processing means may also be embedded together with the sensor in the semiconductor package. A person skilled in the art knows that the sensor or parts thereof may be integrated in the same semiconductor substrate as the controller, forming a composite integrated circuit.

Even if the integrated circuit (IC) implementing the sensor is embedded into a semiconductor package, any damage of or stress exerted onto the semiconductor package should still be avoided, since such a damage could damage also the embedded integrated circuit (IC) while the stress onto the semiconductor package could translate into stress on the integrated circuit (IC), which would degrade the IC performance.

In a further preferred embodiment example, the element may consist of a single element or a plurality of elements. This means that the element may be fabricated from a single piece of material, or from a set of pieces of material. The pieces of the set of pieces of material could touch each other when forming the element. However, at least one piece of the set of pieces of material could also be isolated from all other pieces of material forming the element. For example, in case the sensor is a magnetic sensor, the element may comprise one or more magnets and/or one or more conductors. In case the sensor is an optical sensor, the element may comprise one or more reflectors, scatterers or absorbers. The element may comprise a powder. Hence, the element may comprise a substance composed of a large number of loose grains. For example, for a magnetic sensor, the element may comprise a powder of magnetic compounds and/or a powder of conductive compounds. In case the sensor is an optical sensor, the element may comprise a powder of reflectors, scatterers or absorbers. The powder may also be a powder of nanoparticles. Nanoparticles are particles that are not visible for the human eye. For example, for a magnetic sensor, the element may comprise a powder of magnetic and/or conductive nanoparticles, and for an optical sensor, the element may comprise a powder of reflective, scattering or absorbing nanoparticles.

The above-mentioned objects are also solved by a method for measuring a force using a soft sensor arrangement according to the invention comprising the steps of receiving a signal from a sensor reacting with an element, when an deformable element extending at least partially between the sensor and the element is deformed by the to be measured force, and estimating the strength of the force from the received signal based on a predefined correlation between values of the force and values of the signal of the sensor.

The element is adapted to cause a physical signal at the sensor, which depends on the position and orientation of the element with respect to the sensor. The physical signal can be a one-dimensional signal or a multi-dimensional signal. Furthermore, the physical signal can be a single one-time, one- or multi-dimensional signal, or a multivariate series of one- or multi-dimensional signals, for example, a time trace of one- or multi-dimensional signals. If the element changes its position and/or its orientation, the physical signal detected by the sensor undergoes a corresponding signal change.

Before applying an external force to the sensor arrangement, the element is located at a first position with respect to the sensor. This first position is defined by the extent of the deformable element, which is arranged between the sensor and the element. This first position coincides with a first signal measurement. When the deformable element is deformed by the external force, the element moves to a second position. If the deformable element is compressed, then the second position is closer to the sensor than the first position. This positional change of the element changes the reaction of the element with the sensor and leads to a change in measurement taken by the sensor. Once the external force is released from the deformable element, e.g., by releasing an object pressed against the deformable element, the deformable element returns to its initial shape, the element performs a coaligned motion back to the first position and the sensor determines again the corresponding initial physical signal. If the deformable element is not compressed but expanded, then the second position is further away from the sensor than the first position. This positional change of the element again changes the reaction of the element with the sensor and leads to a change in measurement taken by the sensor. Once the external force is released from the deformable element, e.g., by releasing an object pulling the deformable element, the deformable element returns to its initial shape, the element performs a coaligned motion back to the first position and the sensor once again determines the corresponding initial physical signal. In both cases, the applied external force may be estimated from the physical signal using a look-up table or an algorithm, as described above. Thereby, it is not necessary to find explicit analytical expressions or a mathematical model to express a relationship between the physical signal and the applied external force. Instead, a machine learning (ML) approach could be used to sample the non-linear stress-strain curve of the deformable element. Thus, machine learning (ML) might be applied to infer the correlation between values of the force and values of the signal of the sensor, which is then used to estimate the force, if the signal of the sensor is given.

The above-mentioned objects are also solved by a gripper according to the invention comprising at least two robotic fingers, wherein at least one of the at least two robotic fingers comprises a soft sensor arrangement according to the invention. A robotic finger may be a mechanical device that may be adapted to exert a force onto an object. If two robotic fingers opposing each other are contained in the gripper, the two opposing robotic fingers may also be called a jaw. The two opposing robotic fingers of the jaw may be complementary to each other in the sense that there exists at least one common axis of symmetry of the two robotic fingers that constitute the jaw. However, a person skilled in the art knows that any number of robotic fingers may be used.

For the gripper according to the invention, at least one robotic finger of the at least two robotic fingers of the gripper may contain a single soft sensor arrangement, such that, in this case, the other of the at least two robotic fingers does not include a soft sensor arrangement. In this case, both robotic fingers exert a gripping force onto the gripped object, but only one robotic finger is used to measure the gripping force. Redundancy in measuring the gripping force could be achieved by equipping more than one of the at least two robotic fingers with an individual soft sensor arrangement according to the invention. For example, if two of the at least two robotic fingers include a respective soft sensor arrangement, and if the gripping forces exerted by the two robotic fingers are co-linear, i.e., the object is gripped from both sides under similar angles, the measured gripping forces of the two soft sensor arrangements display the same absolute value. Hence, use of more than one soft sensor arrangement has the benefit of allowing to average measurements to achieve a higher precision, when determining the force, or to avoid that force determination becomes impossible, if one soft sensor arrangement is defect.

In another preferred embodiment of the invention, the at least one soft sensor arrangement of the gripper may be removably attached to the respective at least one robotic finger. Removably means in this context that the robotic finger and the soft sensor arrangement can be detached from each other without damaging the soft sensor arrangement or the robotic finger. If the at least one soft sensor arrangement is attached removably to the respective robotic finger, a replacement of the soft sensor arrangement is possible with low effort and cost. For example, the at least one soft sensor arrangement could be attached to the respective robotic finger by one or more screws, by glue, or using a tap. It is also possible that the soft sensor arrangement is clamped to the respective robotic finger. In this case, the soft sensor arrangement and the respective robotic finger could include corresponding bearings which are pushed and/or pulled over each other to attach the soft sensor arrangement to the respective robotic finger.

In another preferred embodiment of the invention, the at least one soft sensor arrangement of the gripper may be monolithically integrated into the at least one robotic finger. In this case, the soft sensor arrangement and the respective robotic finger of the gripper can, for instance, be manufactured integrally. This means that the soft sensor arrangement and the respective robotic finger can be manufactured as a mono-bloc. For example, some components of the soft sensor arrangement can be fabricated in one piece with some components of the robotic finger. It is also possible that the soft sensor arrangement and the respective robotic finger are initially manufactured as two separate pieces, which are then over-molded to be attached together, thereby forming a single piece. During the over-molding, the two pieces can be heated such that a connection between two melted regions of the two separate pieces can be established, which, after cooling down, constitutes a rigid link between the soft sensor arrangement and the respective robotic finger.

The above-mentioned objects are also solved by a method for operating a gripper arrangement according to the invention for gripping an object by means of a gripper comprising at least two robotic fingers, wherein at least one robotic finger comprises a soft sensor arrangement according to the invention. The method comprising elongating a distance between the at least two robotic fingers of the gripper until the distance between the at least two robotic fingers can accommodate the object to be gripped. Gripping the object by reducing the distance between the at least two robotic fingers, thereby applying a force to the object, whereby an deformable element of the soft sensor arrangement is deformed, measuring the force applied to the object by the two robotic fingers by a reaction of the sensor to an element, wherein the deformable element extends at least partially between the sensor and the element, and controlling the movement of the at least two robotic fingers based on the measurement. A feedback loop may be created between the measured force and the force applied to the object by the at least two robotic fingers.

BRIEF DESCRIPTION OF THE DRAWINGS

The following description and the annexed figures set forth in detail certain illustrative aspects of the soft sensor arrangement, the gripper, and the respective two methods described above. These aspects are indicative, however, of but a few of the various ways in which the principles of various embodiments can be employed and the described embodiments are intended to include all such aspects and their equivalent.

In the figures, like reference characters generally refer to the same parts throughout the different figures. The figures are not necessarily to scale. Instead, a general focus is put on an explanation of the universal principles of the invention.

Figures 1, 2A, 2B:
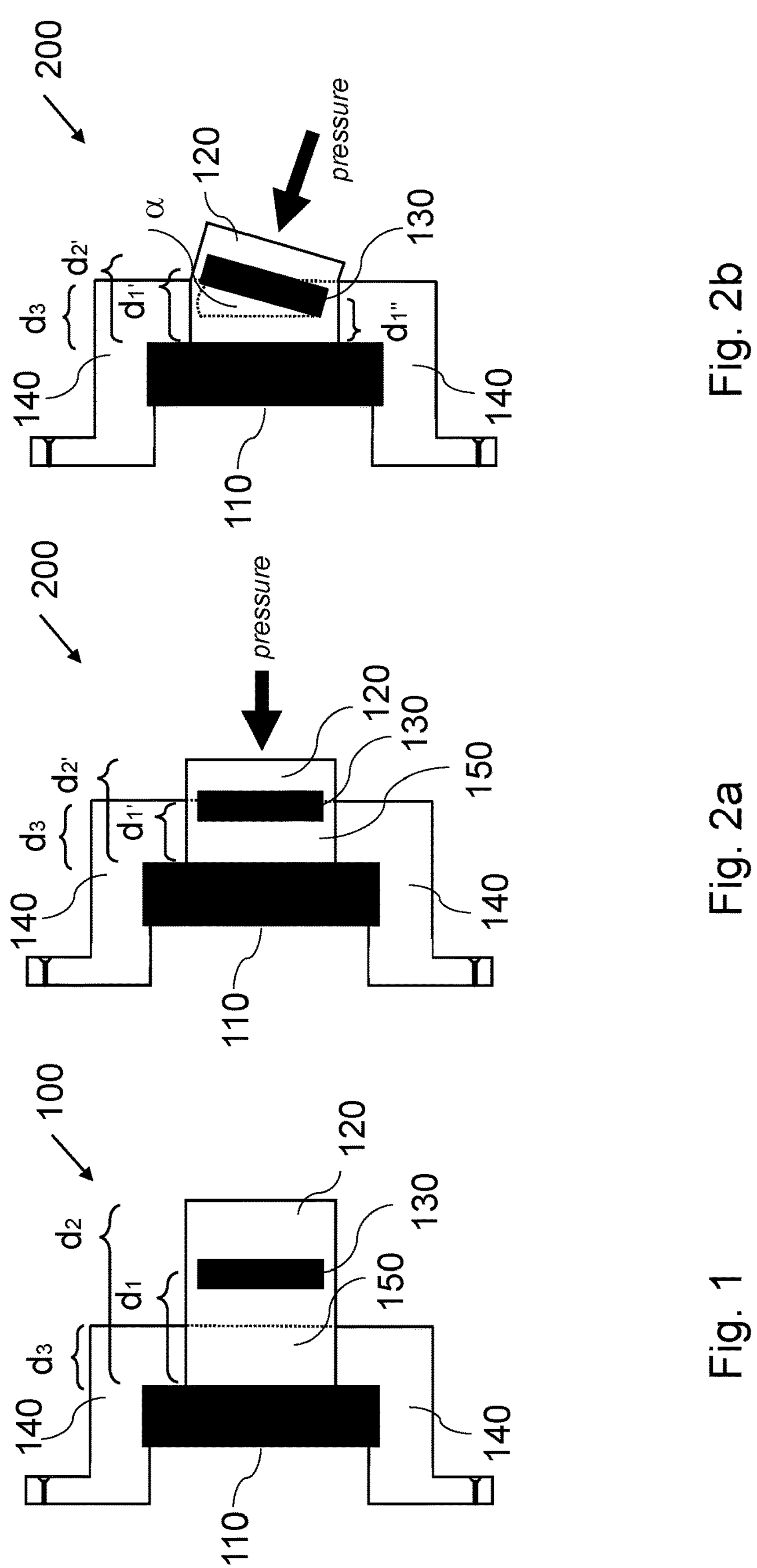
Figure 4:
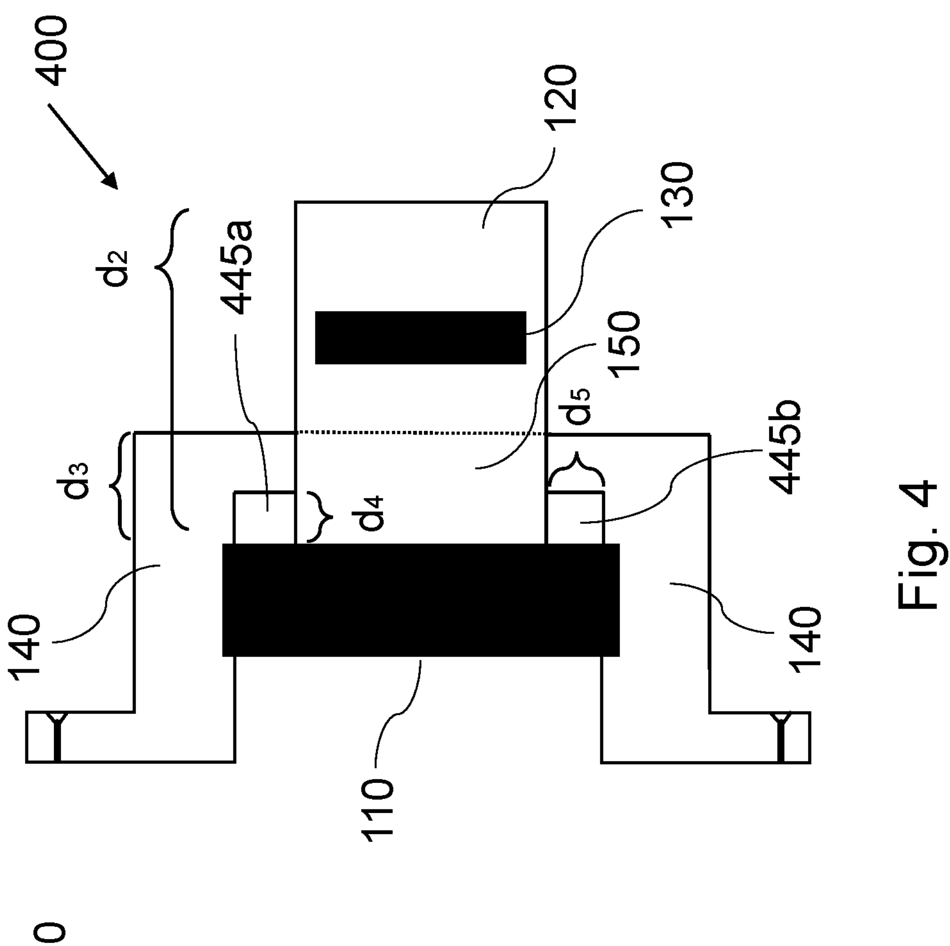
Figure 3:
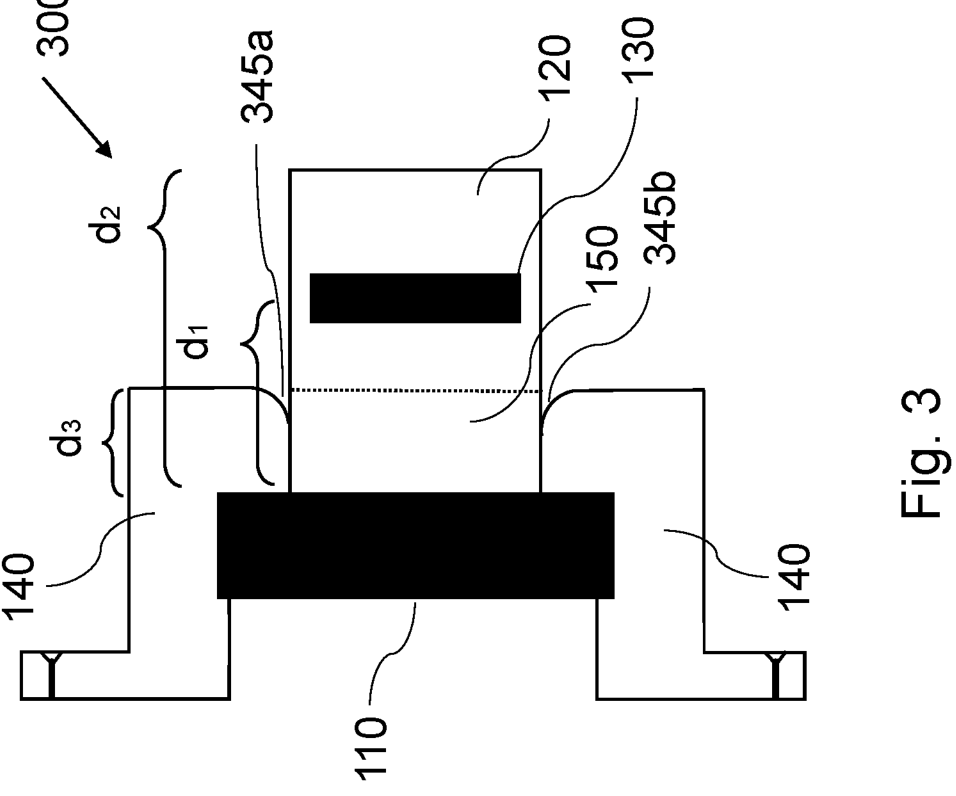
Figure 6:
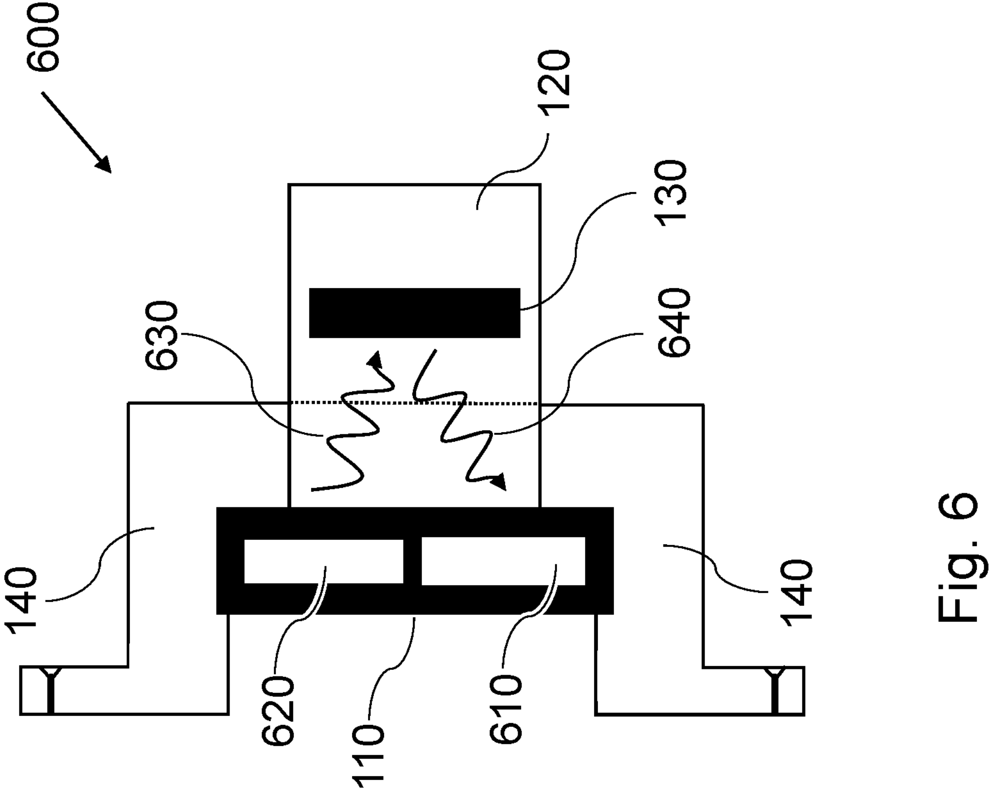
Figure 5:
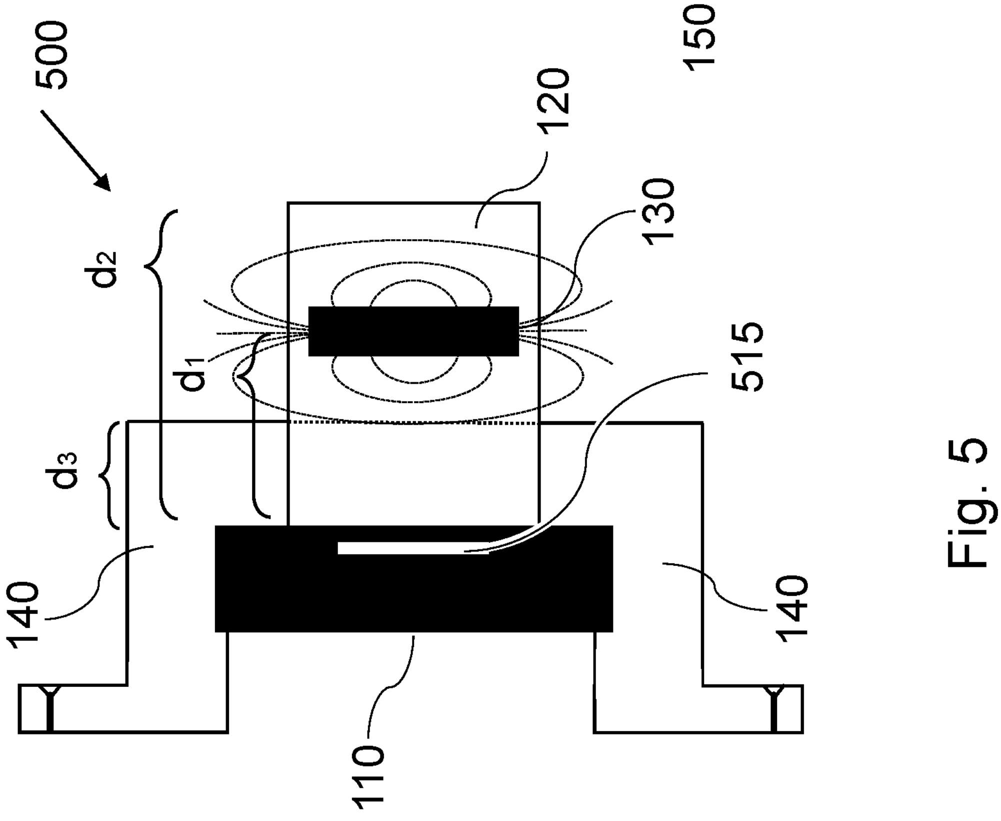
Figure 7:
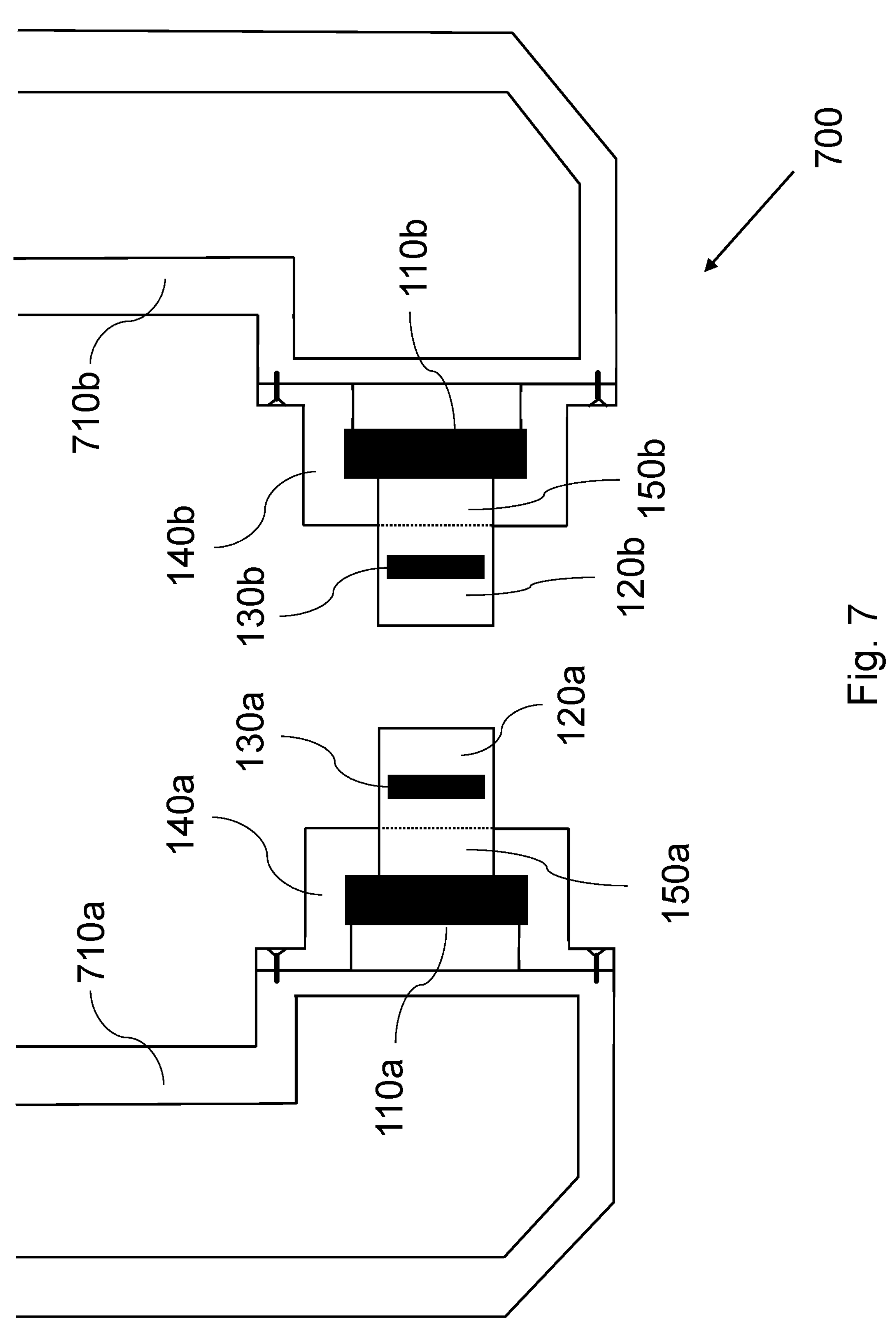
Figure 8:
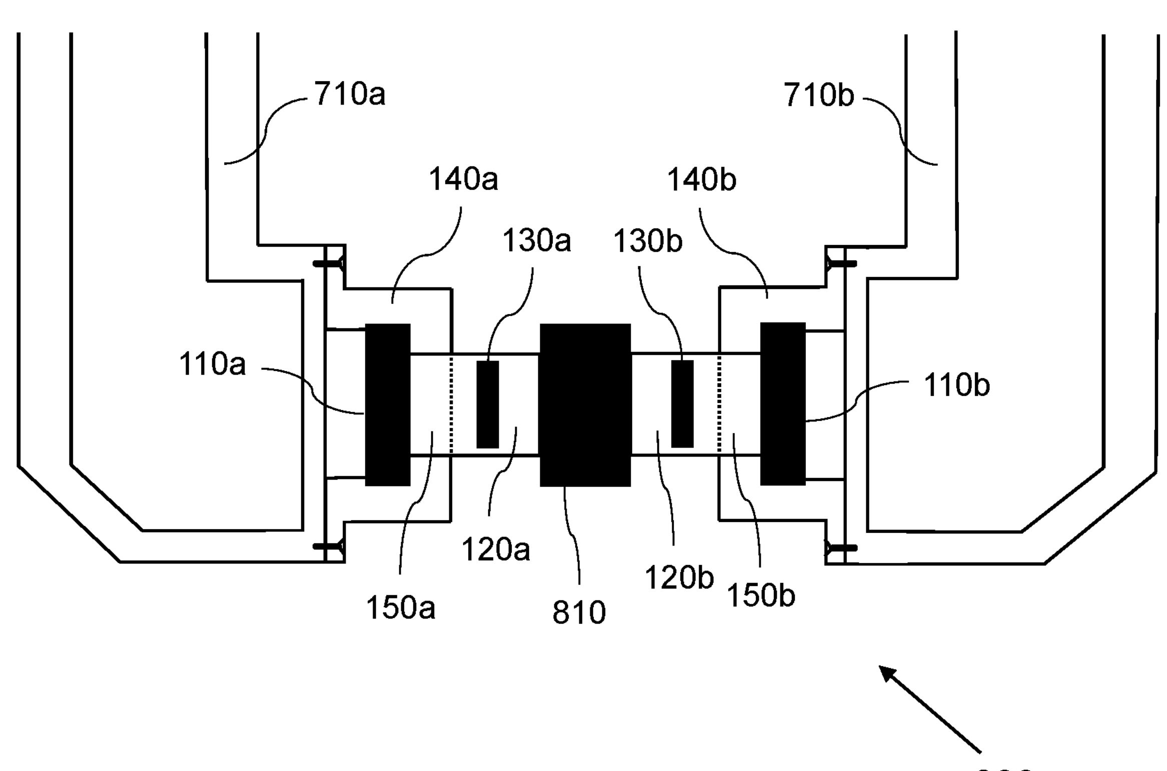
Figure 9:
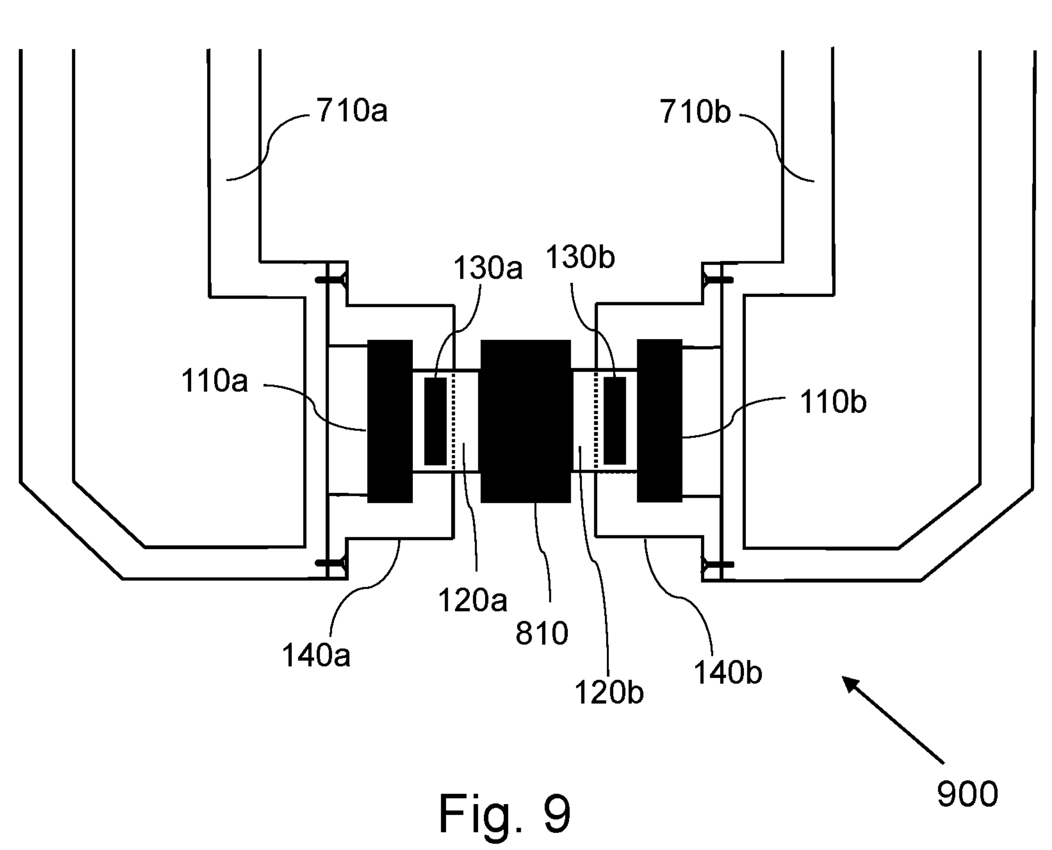

In the following description, various embodiments of the invention are described with reference to the following figures:

FIG. 1 shows a section view of an embodiment example of a soft sensor arrangement according to the invention without any external force applied;

FIG. 2*a* shows the section view of the soft sensor arrangement of FIG. 1 with a linear external force applied;

FIG. 2*b* shows the section view of the soft sensor arrangement of FIG. 1 with a non-linear external force applied;

FIG. 3 shows a section view of another embodiment example of a soft sensor arrangement according to the invention featuring a mechanical stop with rounded and/or oblique edges;

FIG. 4 shows a section view of another embodiment example of a soft sensor arrangement according to the invention featuring a space for accommodating the deformed deformable element;

FIG. 5 shows the section view of the soft sensor arrangement of FIG. 1, in which the sensor is a magnetic sensor;

FIG. 6 shows the section view of the soft sensor arrangement of FIG. 1, in which the sensor is an optical sensor;

FIG. 7 shows a section view of a gripper according to one embodiment example of the invention;

FIG. 8 shows the section view of the gripper of FIG. 7 holding an object, but without deformation of the deformable element; and FIG. 9 shows the section view of the gripper of FIG. 7 holding an object, while deforming the deformable element.

DETAILED DESCRIPTION

The following detailed description refers to the accompanying figures that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

FIG. 1 depicts a section view of a soft sensor arrangement 100 according to an embodiment example of the invention. The soft sensor arrangement 100 comprises a sensor 110, an deformable element 120, and an element 130 for reacting with the sensor 110. For example, the deformable element 120 may comprise at least one of an elastomer, a polymer, a rubber and a vulcanizate. The deformable element 120 may also comprise a flexible element, an elastic element or a flexible structure. The flexible element or the flexible structure may be made of metal. For example, the flexible element or the flexible structure may be a made of metallic flexible beams. In the here shown embodiment example, the element 130 is fully embedded in the deformable element 120. Fully embedded means that the deformable element 120 is completely surrounding the element 130, which means all surfaces of the element 130 are in contact with the deformable element 120. It can also be said that the element 130 is enveloped by the material of the deformable element 120. The deformable element 120 is deformable by applying an external force. The applied external force may cause the deformable element 120 to be compressed such that the distance between the element 130 and the sensor 110 changes. This change in distance can be detected by the sensor 110. For example, if the element 130 is a magnet and the sensor 110 is a magnetic sensor, then the reduction in distance between the element 130 and the sensor 110 causes the sensor to detect a different magnetic field, e.g. a different magnetic field strength and/or orientation as compared to before the deformation. Hence, from a change in the measured physical unit, it can be deducted how much the deformable element 120 is deformed. The person skilled in the art will however notice that also other types of sensor 110/element 130 combinations can be used for measuring the amount of distance the deformable element 120 has been compressed.

Each individual deformation of the deformable element 120 corresponds to a different applied external force, which in turn is associated with a respective physical measurement obtained by the sensor 110. Hence, a correlation between applied external force values and corresponding measurement values of the sensor 110 exists. This correlation can be determined during an initial calibration step of the sensor 110 or can be predetermined by knowing the bulk modulus and/or a shear modulus of the deformable element 120. The correlation itself can, for instance, be established as a look-up table including external force values and their associated sensor readings. The correlation between applied external force values and corresponding measurement values of the sensor 110 could be established using a model trained by machine learning. A person skilled in the art also knows other ways to establish the respective correlations, all of which are encompassed hereby. Once an actual measurement of the sensor 110 is obtained, the look-up table can be used to infer an estimate for the external force. However, by knowing the bulk modulus and/or the shear modulus of the deformable element 120 also an algorithm can be used, which outputs the actual force applied in respect to the amount of deformation by ease of calculation. The algorithm may be a non-linear model, which defines the actual force as a non-linear function of the measurement values of the sensor 110. The algorithm or the correlation may be implemented inside an integrated circuit (IC) containing the sensor 110, or outside the integrated circuit containing the sensor 110, or partially inside the integrated circuit containing the sensor 110 (e.g. for calculating the position of the element 130 from the sensor signal), and partially outside the integrated circuit containing the sensor 110 (e.g. for inferring the force from the displacement of the element 130). The sensor 110 may be configured to provide dual sensing, which allows detection of linear forces as well as shear forces, for example a linear force in the direction of the external force and shear forces in one direction or two orthogonal directions in the plane perpendicular to the direction of the external force. The correlation or the algorithm may provide a direct link between the applied external force values and the measurement values of the sensor 110. Optionally, the correlation or the algorithm may compute the displacement of the element 130 as an intermediate step. In this case, a first correlation or a first algorithm determines the position of the element 130 from the measurement values of the sensor 110, and a second correlation or a second algorithm determines the applied external force value from the position of the element 130. Thus, in this case, the determining the position of the element 130 acts as an intermediate step.

In the shown example, the soft sensor arrangement 110 further includes a mechanical stop 140 that limits the deformation of the deformable element 120. Such a limitation of the maximum deformation of the deformable element 120 avoids that the sensor 110 and/or the deformable element 120 are damaged, when the deformable element 120 is deformed. In the here shown embodiment example, the mechanical stop 140 at least partially surrounds the sensor 110. A gap 150 formed in the mechanical stop 140 holds the sensor 110 in a particular location within the mechanical stop 140. The sensor 110 can be fixed to the mechanical stop 140 or can be replaceably fixed to mechanical stop 140. The latter allows that the same mechanical stop 140 can be used with different sensor arrangements, e.g., when the type of sensor 110 shall be changed for example to be better suited for changing environmental circumstances or for repairs, and maintenance.

In the here shown embodiment example, the deformable element 120 is arranged in a gap or aperture 150 within the mechanical stop 140. Thereby, a first end of the deformable element 120 contacts the sensor 110, whereas a second end of the deformable element 120, which opposes the first end, extends through the gap or aperture 150 from the mechanical stop 140. On this second end the force will be applied, which will cause the second end to come closer to the sensor 110 (as can be seen in FIG. 2). The element 130 embedded within the deformable element 120 has in the here shown embodiment example a distance, d1, from the sensor 110, which is smaller than the distance, d2, of the second end of the deformable element 120 from the sensor 110, but which is larger than the distance, d3, of the end surface of the mechanical stop 140 to the sensor 110.

In a not limiting sense, the distance, d1, of the element 130 from the sensor 110 may be 3 mm, the distance, d2, of the second end of the deformable element 120 from the sensor may be 4 mm, and the distance, d3, of the end surface of the mechanical stop 140 to the sensor 110 may be to 2.8 mm. Through the action of the mechanical stop 140, the deformation of the deformable element may therefore be restricted to 1.2 mm. It shall however also be encompassed that this deformation may be restricted in general to less than 20%, or less than 30%, or less than 40% of the extent of the deformable element 120 in the direction of application of the force. Without an applied external force, the distance, d1, of the element 130 from the sensor 110 may also be smaller than the distance, d3, of the end surface of the mechanical stop 140 to the sensor 110. A person skilled in the art knows that these dimensions are only named for illustrative purposes and shall not be understood to be limiting if not explicitly mentioned.

FIG. 2*a* shows a section view of the soft sensor arrangement 100 of FIG. 1 with an applied external force ('pressure'). The applied external force can be uniform, i.e., constant over a surface of application of the force. However, the applied external force can also be non-uniform, i.e., varying over the surface of application of the force. This variation of the force over the surface of application may be linear or non-linear. In other words, each point on the surface of application of the force may be assigned a different force value, which is related to the neighboring force values according to a linear or a non-linear relationship. In the shown example, the external force is uniform over the surface of the deformable element 120 and applied perpendicularly to the surface of the sensor 110. The applied external force compresses the deformable element 120. This causes the distance, d2, of the second end of the deformable element with respect to the sensor 110 to be reduced to a shorter distance, d2'. Due to the fact that the element 130 is embedded in the deformable element 120 also the distance, d1, of the element 130 to the sensor 110 is reduced to a shorter distance, d1'.

The sensor 110 is configured to detect the change of distance, d1 to d1', by reacting with the element 130. If the sensor 110 is a magnetic sensor and the element 130 is a magnet, then the lower distance between the sensor 110 and the element 130 causes the sensor 110 to detect a higher magnetic field strength, since it is proportional to the distance. The change in magnetic field strength as such allows to conclude the force applied to the deformable element 120. In some cases, if the sensor 110 is a magnetic sensor, it is possible that the sensor 110 detects, additionally or alternatively to the magnetic field strength, a change of orientation of the magnetic field strength vector, i.e., of one or more angles assigned to the magnetic field vector. In this case, the magnetic sensor may be located at an offset with respect to the axis of the magnet. Whereas here only a one-dimensional distance measurement and as such a perpendicularly applied force is described, the person skilled in the art will notice that the element 130 may also be inclined at an angle as shown in FIG. 2*b*.

In FIG. 2*b*, the external force ('pressure') is applied uniformly but not perpendicular to the surface of the sensor 110. Hence, the applied external force deforms the deformable element 120 in a direction not perpendicular to the surface of the sensor 110. This causes the distance, $d_1$, of the element 130 to the sensor 110 to be changed in a non-homogeneous way. For example, the upper end of the element 130 is moved to a larger distance, $d_{1'}$, but the lower end of the element 130 is moved to a lower distance, $d_{1''}$. Since the distances $d_{1'}$ and $d_{1''}$ are different if a non-linear force is applied, the element 130 is tilted by a non-zero angle $\alpha$ with respect to the sensor 110. Thus, with a non-perpendicular external force the element 130 is not only translated, but also rotated. The sensor 110 is adapted to detect the change of the angle $\alpha$ by the reaction with the element 130. If the sensor 110 is a magnetic sensor and the element 130 is a magnet, the different angle $\alpha$ between the sensor 110 and the element 130 causes the sensor 110 to detect a different magnetic field, since the orientation of the magnetic field lines of the magnet 130 has been changed with respect to the sensor 110. It could also be said that the rotation of the element 130 by the angle $\alpha$ causes the sensor 110 to perceive a rotated three-dimensional magnetic field from the element 130. Under rotations, the absolute magnetic field strength does not change but the orientation of the magnetic field vector in space is changed. Hence, the sensor 110 perceives different magnetic fluxes as compared to no rotation of the element 130, since the projections of the magnetic field vector onto the surfaces, over which the sensor 110 measures the magnetic fluxes, are different. The change in the measured magnetic fluxes allows to infer the change of the position of the element 130. The positional change of the element 130 is uniquely linked to the force exerted onto the deformable element 120. Hence, if a non-perpendicular force is applied to the deformable element 120, a rotation of the element 130 could be used to determine the force applied to the deformable element 120.

The mechanical stop 140 as shown in FIGS. 1, 2*a* and 2*b* limits the deformation of the deformable element 120, when the external force is applied to the deformable element 120. This has the effect that the distance, d2', of the second end of the deformable element 120 never undercuts a finite minimum distance, d3, which is given by the distance between the end of the mechanical stop 140 facing away from the sensor 110 and the sensor 110. By limiting the deformation of the deformable element 120, also the minimum distance between the element 130 and the sensor 110 is defined, since the movement of the element 130 is coaligned with the movement of the compression of the deformable element 120. This has the advantage that the element 130 does not come too close to the sensor 110 which may cause damages to the sensor 110 or may impair the sensitivity of the sensor 110. For example, due to an overload of the sensor 110.

Furthermore, any unlimited deformation of the deformable element 120 may also risk damaging the deformable element 120 itself. For example, by deforming the deformable element 120 too strongly, the internal bonds of the deformable element may be destroyed which causes the deformable element to rip. This risk is present even more so when the element 130 is made out of material which is more rigid than the deformable element itself. This may cause damages to the deformable element 120, which are prevented by limiting the deformation of the deformable element 120.

In the embodiment example shown in FIGS. 1, 2*a*, and 3*b*, the gap, aperture or recess 150 is dimensioned in a way to accommodate the compressed deformable element 120 as well as the element 130.

The recess 150 can be dimensioned such that the deformable element 120 can be moved into the recess 150, while the element 130 cannot be moved into the recess 150. In this case, the element 130 is pressed against the mechanical stop 140, when a critical external force is applied to the deformable element 120, but the element 130 does not enter into the recess 150, even if the external force is further augmented beyond the critical external force. Instead, any excess force of the external force with respect to the critical external force is then conducted directly onto the mechanical stop 140. It could be said that, in this case, the mechanical stop 140 and the element 130 act together to assure that the element 130 does not contact the sensor 110, or that the deformable element 120 is not too strongly compressed against the sensor 110.

Optionally, the recess 150 of the soft sensor arrangement 100 can also be dimensioned to at least partially accommodate the element 130. Hence, by applying an external force to the element 130, the element 130 can at least partially enter the recess 150. If at least a part of the deformable element 120 is located in between the element 130 and an object pressing against the deformable element 120, this part of the deformable element 120 can also be compressed at least partially into the recess 150. The object touches the mechanical stop 140, once a critical force is applied to the object. At this point, any applied external force exceeding the critical force is conducted onto the mechanical stop 140. In this way, the recess 150 limits not only the strain on the part of the deformable element 120 located in between the sensor 110 and the element 130, i.e., facing the sensor 110, but potentially also the strain exerted on the part of the deformable element 120 located in between the element 130 and the object, i.e., facing the object. In other words, the mechanical stop 140 may define a minimum distance of the element 130 to the sensor 110 and a minimum volume, which can be occupied by the deformed deformable element 120.

FIG. 3 shows a section view of a soft sensor arrangement according to another embodiment example of the invention featuring a mechanical stop 140 with two rounded edges 345*a*, 345*b*. If the shear modulus of the deformable element 120 is non-zero, an applied external force leads to a deformation of the deformable element 120 in at least one direction orthogonal to the direction of the applied external force. In other words, the deformable element 120 is quenched and occupies an excess volume in the at least one orthogonal direction as compared to the non-deformed (relaxed) state of the deformable element 120. In this case, the deformed deformable element 120, and in particular the part of the deformed deformable element 120 occupying the excess volume, could easily be damaged if the mechanical stop 140 would feature sharp edges facing the deformable element 120. As a remedy, rounding and/or rendering oblique the edges 345 of the mechanical stop 140 facing the deformable element 120 creates a volume inside the mechanical stop 140 which is adapted to accommodate at least the excess volume of the deformable element 120 due to the shear deformation of the deformable element 120.

FIG. 4 shows a section view of a soft sensor arrangement according to another embodiment example of the invention featuring two spaces 445*a*, 445*b* for accommodating material of the deformed deformable element 120. In the here shown example, the two spaces 445 have the form of cubes, but can in principle also assume any other geometrical shape which is suitable to accommodate an excess volume of the deformable element 120 (not shown). The two shown spaces 445 may be defined by one or more distances, d4, between a start surface of the mechanical stop 140 and the sensor 110, and/or by one or more distances, d5, between a shaft surface of the mechanical stop 140 and the adjacent surface of the non-deformed deformable element 120. Thereby, a shaft surface of the mechanical stop 140 is a surface of the mechanical stop 140 perpendicular to the surface of the sensor 110, and a start surface of the mechanical stop 140 is a surface of the mechanical stop 140 parallel to the surface of the sensor 110. The surface of the sensor 110, the adjacent surface of the deformable element 120, the shaft surface and the start surface of the mechanical stop 140 form the boundaries of the space 445 shown in FIG. 4 (section view, 4 boundaries for the shown example of a cube). It could also be said that, viewed from the sensor 110, the space 445 terminates at the start surface of the mechanical stop 140, and is bounded either left or right by the shaft surface of the mechanical stop 150. One or more edges of the one or more spaces 445 may be rounded and/or oblique. In one example, at least one space 445 can extend over the full height of the deformable element 120 measured in a direction perpendicular to the surface of the sensor 110 (not shown). It could also be said that, in this case, the at least one space 445 forms a buffer volume between the non-deformed deformable element 120 and the soft sensor arrangement. The deformable element 120 is then free to move in the direction of the buffer volume formed by the at least one space 445. Thereby, the at least one space 445 may be formed such that the deformable element 120 is free to move in at least one direction parallel to the surface of the sensor 110. In particular, the at least one space 445 may be formed such that the deformable element 120 is free to move in all directions parallel to the surface of the sensor 110, or in only one direction parallel to the surface of the sensor 110. It is also possible that the mechanical stop 140 does not limit the movement of the deformable element 120 in at least one direction parallel to the surface of the sensor 110 such that the deformable element 120 is free to move in the at least one direction parallel to the surface of the sensor 110. If the deformable element 120 is free to move only in one direction parallel to the surface of the sensor 110, this direction may coincide with the direction of the gravitational force. This has the technical advantage that—in addition to the force exerted by an object onto the deformable element 120—also the gravitational force acting onto the object, which is in contact with the deformable element 120, could be measured. In this way, the gripping force acting onto the object as well as the weight of the object can be determined using the same sensor 110.

FIG. 5 shows the soft sensor arrangement, in which the sensor 110 is a passive or an active magnetic sensor 515 and the element 130 is a magnetic field emanating element or a target, respectively. In FIG. 5, the magnetization direction of the element 130 is parallel to the surface of the sensor 110. However, the person skilled in the art knows that any orientation of the magnetization direction of the element 130 with respect to the sensor 110 could be chosen.

A passive magnetic sensor responds to an external magnetic field. This external magnetic field can be emanated by the element. Thereby, the element may be a permanent magnet, or a coil and/or a wire, through which an electric current is flowing. The electrical current could be a DC or an AC electrical current, such that the wire and/or coil produces a constant or a time-varying electro-magnetic field. The passive magnetic sensor may comprise at least one sensor element which is able to measure at least one property of the magnetic field emanated from the element 130. The measured at least one property may for example be the magnetic field strength. The at least one sensor element may be a Hall plate or a magneto-resistive sensor. The at least one sensor element may also comprise a fluxgate sensor, a magneto-impedance (MI) sensor. The Hall plate may be a horizontal Hall plate for which the axis of maximum sensitivity is perpendicular to a substrate, or a vertical Hall plate for which the axis of maximum sensitivity is parallel to the substrate. Hall plates can be made of silicon, e.g., integrated in a CMOS substrate. Hall plates can also be made of a semiconductor compound, e.g., a III-V semiconductor material such as GaAs, which leads to improved sensitivity as compared to silicon.

The at least one measured property of the magnetic field emanated from the element 130 allows to determine the distance change of the element 130 to the sensor 110 when the deformable element 120 is deformed which then allows a determination of the force applied to the deformable element 120.

In an example, the passive magnetic sensor may comprise three sensor elements angularly spaced apart by multiples of 120°. Each of the three sensor elements measures a Bx magnetic field component parallel to the sensor surface, and a Bz magnetic field component perpendicular to the sensor surface. Hence, such a passive magnetic sensor may measure six magnetic field components of the magnetic field generated by the element 130, which may be referred to as (Bx1, Bz1) at the first sensor location, (Bx2, Bz2) at the second sensor location, and (Bx3, Bz3) at the third sensor location. The element 130 is preferably substantially located above the common center of the three sensor elements. By ease of these sensor elements not only the distance of the element 130 to the sensor 110 can be determined, but also its rotation, for non-perpendicular force measurements.

In an example, the passive magnetic sensor may comprise four sensor elements angularly spaced apart by different angles. These angles may be multiples of 90° but could also be chosen individually for each of the four sensor elements. Each of the four sensor elements measures a Bx magnetic field component parallel to the sensor surface, and a Bz magnetic field component perpendicular to the sensor surface. Hence, such a passive magnetic sensor may measure eight magnetic field components of the magnetic field generated by the element 130, which may be referred to as Bx1 and Bz1 at the first sensor location, Bx2 and Bz2 at the second sensor location, Bx3 and Bz3 at the third sensor location, and Bx4 and Bz4 at the fourth sensor location.

In a more general embodiment of the claimed invention, the passive magnetic sensor may comprise a variable number N of sensor elements angularly spaced apart, wherein each individual angle is associated with a respective sensor element of the N sensor elements. Each of the sensor elements measures a Bx magnetic field component parallel to the sensor surface, and a Bz magnetic field component perpendicular to the sensor surface. Thus, the passive magnetic sensor may measure 2*N magnetic field components of the magnetic field generated by the element 130, which may be referred to as Bxi and Bzi at the location of the i-th sensor with N being the total number of sensor elements. As for the embodiment with N=3 sensor elements above, also in the case of arbitrary N, the element 130 is preferably substantially located above the common center of the N sensor elements. By ease of these N sensor elements not only the distance of the element 130 to the sensor 110 can be determined, but also its rotation, in case of non-perpendicular force measurements.

In contrast, an active magnetic sensor creates or changes a magnetic field on its own which is then altered or influenced by a target. The active magnetic sensor may as such comprise at least one sensor element emanating a magnetic field and at least one sensor element measuring the change in the magnetic field by the element. However, the active magnetic sensor may also comprise at least one sensor element, which performs both, emanating the magnetic field and measuring the change in the magnetic field. In this case, the sensor element may be adapted to operate as sensor element emanating a magnetic field during a first time interval, and to operate as sensor element measuring the change in the magnetic field during a second time interval. For example, an active magnetic sensor may contain a coil or a wire which radiates an electromagnetic wave having a time-varying magnetic field component during a first time interval, and which captures an electromagnetic wave during a second time interval. The changes in the emanated magnetic field thereby may be caused by the target, for example via induction. The target may itself thereby be non-magnetic. For example, the target may be designed as a planar structure of metal, which features conductive lines in a preferred direction in space. Such a target will then alter at least one property of the magnetic field emanating from the active magnetic sensor, and the alteration of the at least one property of the emanated magnetic field can in turn be measured. The alteration of the at least one property of the emanated magnetic field then allows to determine the distance change of the target and the sensor 110 when the deformable element 120 is deformed, since the alteration of the emanated magnetic field is proportional to the distance of the element 130 and the sensor 110.

Shear stress can advantageously be measured with high precision, when the spatial dimension of the element 130, e.g., of the magnet or the target, is smaller than the spatial dimension of the sensor 110, e.g. of the passive or the active magnetic sensor, in particular with ratios equal to or larger than 1.5, e.g. between 1.5 and 3.

FIG. 6 shows a section view of the soft sensor arrangement, in which the sensor 110 is an optical sensor 610. The optical sensor 610 measures at least one physical property of a light beam and outputs at least one physical signal proportional to the at least one physical property. In the here shown embodiment example, the element 130 at least partially reflects incoming light 630 falling onto the element 130 such that returned light 640 exiting from the element 130 can be measured by the optical sensor 610. In FIG. 6, the angles under which the incoming light 630 and the returned light 640 appear are related according to the law of reflection (Snell's law). In the shown example, the incoming light 630 is light emitted by an optical transmitter 620 included in the sensor 110. However, the incoming light 630 may also be ambient light, or light generated by an external light source not part of the sensor 110 (not shown). Various ways of creating light falling onto the element 130 can be imagined by a person skilled in the art.

For example, the physical property measured by the optical sensor 610 may be the intensity of the light 640 returned by the element 130. The intensity of the returned light 640 measured by the optical sensor 610 varies depending on the position of the element 130 with respect to the sensor 110. For example, if the element 130 is far away from the sensor 110, a relatively low intensity is registered by the optical sensor 610, since the returned light 640 is spread over a comparatively large solid angle such that a comparatively small fraction of the returned light 640 hits the surface of the optical sensor 610. In contrast, if the element 130 is close to the sensor 110, the returned light 640 is spread over a smaller solid angle, and a larger fraction of the returned light 640 hits the surface of the optical sensor 610. Consequently, a higher intensity is registered by the optical sensor 610. Hence, the registered light intensity allows to draw conclusions about the position of the element 130, which in turn are uniquely linked to the external force applied to the deformable element 120, as described above.

FIG. 7 shows a section view of a gripper 700 with an embodiment example of two sensor arrangements attached to the gripper 700. A gripper is a mechatronic device for exerting a force and a corresponding counterforce onto an object in order to manipulate the position and/or orientation of an object. To this end, the gripper 700 shown in FIG. 7 includes two robotic fingers 710*a*, 710*b*. The robotic fingers 710*a*, 710*b* are adapted to conduct the desired force and counterforce onto an object. In the non-limiting example shown here, the gripper 700 includes two robotic fingers 710*a*, 710*b*, each including one soft sensor arrangement. However, it is also possible that only one robotic finger of the two robotic fingers includes a soft sensor arrangement, or that the gripper contains more than two robotic fingers, each with or without a soft sensor arrangement (not shown). The two shown soft sensor arrangements are attached removably to the respective robotic fingers 710*a*, 710*b* by means of screws (highlighted in FIG. 7). However, each soft sensor arrangement can also be monolithically integrated with the respective robotic finger 710*a*, 710*b* (not shown). A person skilled in the art knows when to use which of the foregoing alternatives. As described above, removably attaching means attaching by some means which does not lead to damage of the soft sensor arrangement or of the respective robotic finger 710, when their attachment is released. This may include an attachment comprising screws (shown), glue, or a cohesive tape. Monolithic integration means that the mechanical stop 140*a* and the respective robotic finger 710*a* are either manufactured as one piece, or from one or more separate pieces, which are overmolded to constitute the shown part of the gripper 700. A person skilled in the art knows that special applications of a gripper could require more than two robotic fingers 710 to be included into the gripper 700, or that one soft sensor arrangement contained in the gripper 700 would already be sufficient for simple force sensing applications, which measure only one of the force or the counterforce exerted by the gripper 700 (not shown).

FIG. 8 shows a section view of the gripper 700 holding an object 810, but without deformation of the deformable element 130. The shown object 810 is located between a first soft sensor arrangement attached to a first robotic finger 710*a* of the gripper 700 and a second soft sensor arrangement attached to a second robotic finger 710*b* of the gripper 700. In the here shown embodiment example, the robotic fingers 710*a*, 710*b* have been contracted such that the surfaces of the deformable elements 120*a*, 120*b* of the two soft sensor arrangements touch the surface of the object 810. However, in the shown embodiment example, no force or counterforce is yet exerted onto the object 810 by the robotic fingers 710*a*, 710*b*. Thus, in the present figure, the deformable elements 120*a*, 120*b* of the soft sensor arrangements are still non-deformed, and the respective sensors 110*a*, 110*b* of the soft sensor arrangements measure physical values corresponding to the initial position and/or orientation of the elements 130*a*, 130*b* embedded in the deformable elements 120*a*, 120*b*. It could also be said that the here shown embodiment example shows the situation just before the gripper 700 exerts a gripping effect onto the object 810, since no friction occurs yet between the outer surfaces of the deformable elements 120*a*, 120*b* facing the object 810 and the corresponding surfaces of the objects 810.

FIG. 9 shows a section view of the gripper 700 holding an object 810, while deforming the deformable element 130. In the here shown embodiment example, the two robotic fingers 710*a*, 710*b* of the gripper 700 have been further contracted as compared to FIG. 8. Hence, the first robotic finger 710*a* exerts a first force onto the object 810, and the second robotic finger 710*b* exerts a second force onto the object 810. In the shown example, the first and second forces are colinear but opposed to each other. Thereby, the deformable elements 120*a*, 120*b* of the two soft sensor arrangements 100 are deformed and the respective elements 130*a*, 130*b* change their positions and/or orientations as compared to their positions and/or orientations with respect to the initial shapes of the non-deformed deformable elements 120*a*, 120*b*, as shown in FIG. 8. Thus, both sensors 110*a*, 110*b* measure physical values different from the physical values corresponding to the initial positions and/or orientations of the elements 130*a*, 130*b*, as shown in FIG. 8.

The measured physical values can be mapped to estimated values for the applied external forces using the methods described above. In more detail, the physical value measured by the first sensor 110*a* may be mapped to a first estimated force value for the first force, and the physical value measured by the second sensor 110*b* may be mapped to a second estimated force value for the second force. The first and second estimated force values are redundant and may therefore be averaged to obtain a composite force estimate with higher precision. Also, one of the first and the second estimated force values may replace the other one, if the corresponding sensor 110*a*, 110*b* fails.

In particular, the estimated force values may be multi-axis force values. Hence, the estimated force values can contain not only the forces exerted by the robotic fingers 710*a*, 710*b* onto the object 810, but also the force of gravity of the object 810. Consequently, the first and second force exerted by the robotic fingers 710*a*, 710*b* onto the object 810 may be controlled as a function of the estimated force values. In particular, the first and second forces exerted by the robotic fingers 710*a*, 710*b* can be made dependent on the force of gravity of the object 810 included in the estimated force values. For example, the first and second forces exerted onto the object 810 by the robotic fingers 710*a*, 710*b* may be set higher for higher forces of gravity of the object 810, i.e., for objects 810 with heavier mass. Correspondingly, for objects 810 with lighter mass, the first and second forces exerted onto the object 810 by the robotic fingers 710*a*, 710*b* may be set lower. Hence, a feedback loop may be created between the first and second forces applied by the robotic fingers 710*a*, 710*b* and the measured force of gravity of the object 810. Furthermore, the first and second forces exerted onto the object 810 by the robotic fingers 710*a*, 710*b* can be limited, to not too strongly grip the object 810.

Thus, the gripper 700 containing at least one soft sensor arrangement 100 according to the invention is able to dynamically adapt the gripping force to the mass of a gripped object, without exposing the object 810 itself to overly strong deformations and while still assuring sufficient grip of the object 810. This leads to secure gripping, without damaging the object, or letting the object fall.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims.

The invention claimed is:

1. A soft sensor arrangement for measuring a force, the soft sensor arrangement comprising:
- a sensor;
- a deformable element, wherein the deformable element is deformable by the force; and
- an element for reacting with the sensor for measuring the force by a deformation of the deformable element, wherein the deformable element extends at least partially between the sensor and the element.

2. The soft sensor arrangement according to claim 1, further comprising:
- a mechanical stop, wherein the mechanical stop limits the deformation of the deformable element.

3. The soft sensor arrangement according to claim 2, wherein the mechanical stop comprises a gap through which the deformable element is at least partially extending.

4. The soft sensor arrangement according to claim 3, wherein the gap is dimensioned to at least partially accommodate the element.

5. The soft sensor arrangement according to claim 2, wherein at least one edge of the mechanical stop facing the deformable element is oblique and/or rounded.

6. The soft sensor arrangement according to claim 2, wherein a distance between the mechanical stop and the sensor defines a space into which the deformable element can be deformed when the force is applied.

7. The soft sensor arrangement according to claim 1, wherein the sensor is a passive magnetic sensor and the element is a magnetic field emanating element.

8. The soft sensor arrangement according to claim 7, wherein the magnetic field emanating element comprises a permanent magnet.

9. The soft sensor arrangement according to claim 1, wherein the sensor is an active magnetic sensor and the element is a target.

10. The soft sensor arrangement according to claim 1, wherein the sensor comprises an optical receiver detecting light, wherein the detected light is light emitted, reflected or scattered back from the element.

11. The soft sensor arrangement according to claim 1, wherein the element is embedded into the deformable element.

12. The soft sensor arrangement according to claim 1, wherein the sensor includes a semiconductor package embedding an integrated circuit (IC).

13. A gripper with at least two robotic fingers, wherein at least one of the at least two robotic fingers comprises a soft sensor arrangement according to claim 1.

14. The gripper according to claim 13, wherein the at least one sensor arrangement is removably attached to the respective at least one robotic finger, or wherein the at least one sensor arrangement is monolithically integrated into the at least one robotic finger.

15. A method for measuring a force using a soft sensor arrangement, the method comprising:
- receiving a signal from a sensor reacting with an element, when a deformable element extending at least partially between the sensor and the element is deformed by the force; and
- estimating the strength of the force from the received signal based on a predefined correlation between values of the force and values of the signal of the sensor.

16. A method for operating a gripper for gripping an object, the gripper comprising at least two robotic fingers, wherein at least one robotic finger comprises a soft sensor arrangement, the method comprising:

elongating a distance between the at least two robotic fingers of the gripper until the distance between the at least two robotic fingers can accommodate the object to be gripped;

gripping the object by reducing the distance between the at least two robotic fingers, thereby applying a force to the object, whereby a deformable element of the soft sensor arrangement is deformed;

measuring the force applied to the object by the two robotic fingers by a reaction of the sensor to an element, wherein the deformable element extends at least partially between the sensor and the element; and controlling the movement of the at least two robotic fingers based on the measurement of the force.

* * * * *